July 8, 1969
J. F. BURKE ET AL
3,454,023
PICK-OFF FOR FLUID ANGULAR RATE SENSOR
Filed Jan. 4, 1967
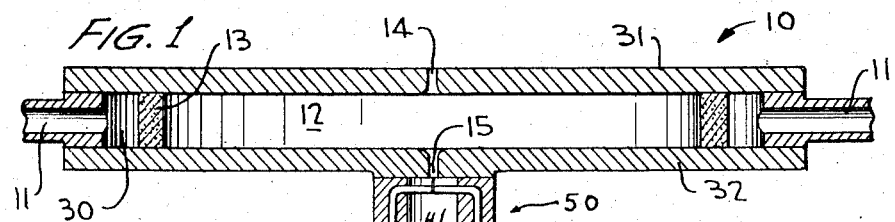
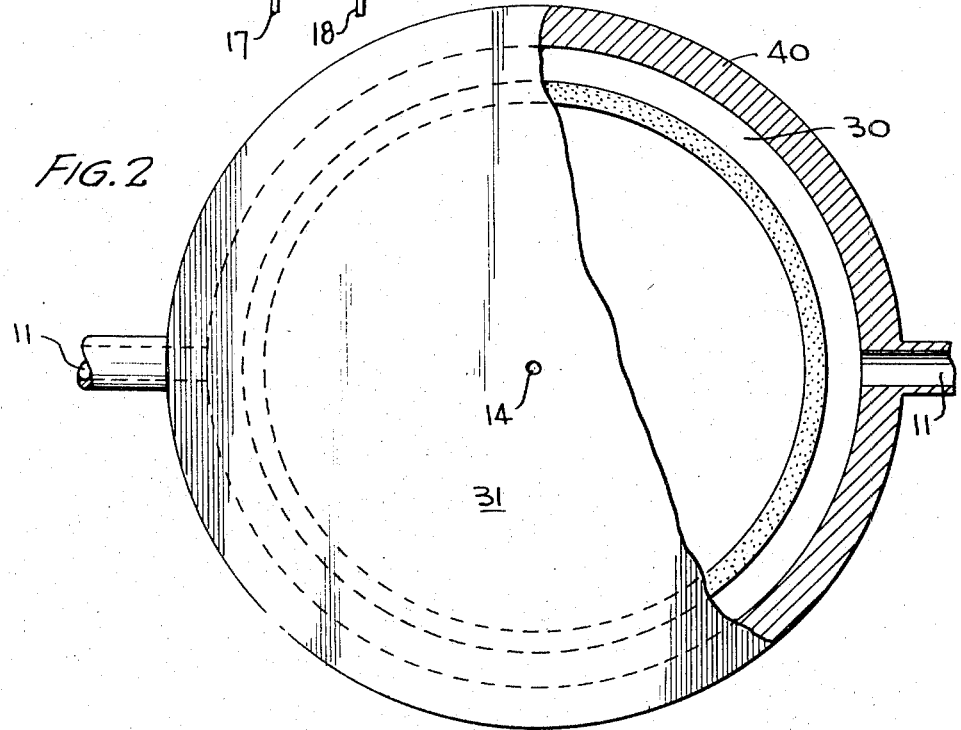
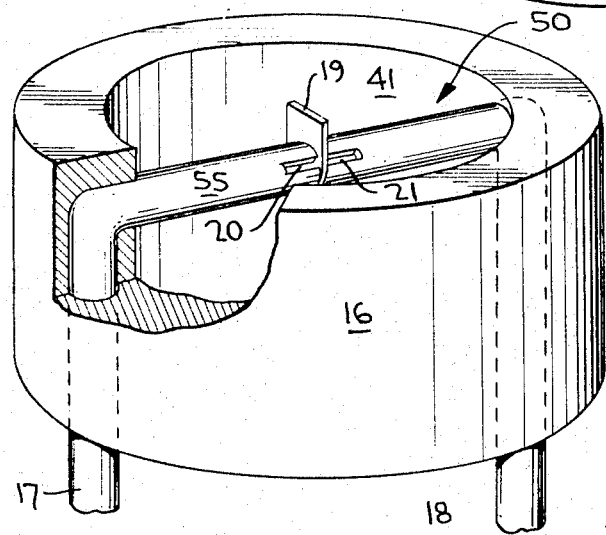
INVENTORS,
JOHN F. BURKE
KENNETH R. SCUDDER
JOHN L. DUNN
BY Harry M. Saragovitz
Edward J. Kelly, Herbert Berl
& J. D. Edgerton
ATTORNEYS

United States Patent Office 3,454,023
Patented July 8, 1969

3,454,023
PICK-OFF FOR FLUID ANGULAR RATE SENSOR
John F. Burke, Beltsville, and Kenneth R. Scudder, Chevy Chase, Md., and John L. Dunn, Fairfax, Va., assignors to the United States of America as represented by the Secretary of the Army
Filed Jan. 4, 1967, Ser. No. 607,614
Int. Cl. G05d *13/02;* F15c *1/16*
U.S. Cl. 137—38      5 Claims

ABSTRACT OF THE DISCLOSURE

An angular rate is impressed upon pure sink flow in a circular vortex chamber having a drain at the center of the chamber. Means are placed external of said drain to measure the effect of the angular rate upon the pure sink flow.

---

This invention relates to the pure fluid amplifier art and in particular to a pure fluid vortex rate sensor.

Vortex rate sensors are no-moving-part devices and are used to indicate an angular rate applied to a body. The typical vortex rate sensor generally comprises a device which provides a fluid flow field which closely approximates the classical two-dimensional pure sink flow in the absence of an angular rate. The fluid flow in a pure sink flow has only a radial velocity component. When the device is subjected to an angular rate (or angular velocity) a pure vortex flow, having only a tangential or rotational velocity, is superimposed upon the pure sink flow. The resulting flow is a combined vortex-sink flow field in which the flow streamlines can be represented by a logarithmic spiral (ignoring viscous effects). Sensing the effect of the angular rate upon the fluid flow field provides a measurement of the magnitude and direction of the angular rate.

While vortex rate sensors, such as described above, have been found to be adequate in providing an indication of the angular rate being measured they have been found to utilize a large quantity of fluid and have not provided as sensitive (defined as pressure signal/angular rate) a device as would be desired. In prior art vortex rate sensors attempts to increase sensitivity have introduced a large measure of noise in the system (noise is defined as any fluctuation in the output not caused by an angular rate applied to the vortex rate sensor). Applicants have provided novel means to increase the sensitivity of the system utilizing a minimum amount of fluid and without the introduction of appreciable noise in the system.

It is therefore an object of the present invention to provide improved means to detect angular rate with a greater sensitivity than heretofore available in the prior art.

It is a further object of the present invention to provide means to detect angular rate with a greater sensitivity than heretofore available in the prior art and with a minimum of noise.

A further object of the present invention is to provide a means to detect angular rate requiring a minimum of fluid power.

Briefly, the present invention measures angular rate by impressing a vortical flow upon pure sink flow in a vortex chamber. Means to measure the effect of the angular rate upon the pure sink flow are provided outside the vortex chamber to minimize the drain from the vortex chamber and increase the sensitivity of the reading.

The specific nature of the invention, as well as other objects, aspects, uses and advantages thereof, will clearly appear from the following description and from the accompanying drawing, in which:

FIGURE 1 is a schematic representation of an embodiment of the present invention.

FIGURE 2 is a top view of FIGURE 1, and

FIGURE 3 is a schematic representation of an embodiment of the pick-off means used in the present invention.

In FIGURE 1 a vortex rate sensor 10 has a pair of axially opposed fluid inlets 11 which direct fluid under pressure into a manifold chamber 30. As can be seen in FIGURE 2 manifold chamber 30 is circular and is formed by section 40, which helps define the fluid inlets, and a coupler ring 13. Coupler ring 13 is any porous material and serves to direct fluid radially toward the center of a vortex chamber 12. Vortex chamber 12 is circular in cross-section and is defined on its top and bottom by a pair of aligned round chamber plates 31 and 32, respectively. A drain 14 is located on top chamber plate 31 while a drain 15 is similarly located in bottom chamber plate 32. Both drains are located in the center of their respective chamber plates and both chamber plates have a rounded portion leading to the drains to improve flow characteristics thereto. Drain 14 leads to a pressure sink while drain 15 leads to a receiver 41 which is formed in the center of a thin walled cylinder member 16 which forms a pick-off means 50. Cylinder 16 is perpendicular to chamber plate 32 and can be separately made from plate 32 and attached thereto or made integral with the plate, whichever is easier. Receiver 41 is of much greater cross-sectional area than drain 15 (FIGURE 1) and as will be seen later plays an important part of the instant invention. In FIGURE 3 a hollow tube 55 is coaxial with an imaginary diameter at the top of cylinder 16 just below drain 15. Tube 55 is supported at its ends in cylinder 16 and leads to a left output passage 17 and a right output passage 18. The output passages and tube 55 can be integral with each other or they can be separately made and joined to each other by any well known method. A thin flat plate 19 is located perpendicular to the axis of tube 55 and extends through the entire tube to form a fluid divider between the part leading to outlets 17 and 18 respectively. Slots 20 and 21 are on opposite sides of plate 19 and are rectangular in cross-section having their major axes along the length of tube 55, and lead to the interior of the tube. While we have shown slots 20 and 21 as being rectangular in cross-section it is obvious that other configurations could be used without departing from the spirit of our invention. In FIGURE 1, the bottom of cylinder 16 can lead to ambient or any other convenient pressure sink. As can clearly be seen pick-off means 50 are located outside drain 15 limiting the amount of fluid needed to sense an angular rate. If the pick-off means were placed in the drain a large area drain would be needed to house the pick-off means and a great quantity of fluid would exhaust through the drain due to its size. By placing the pick-off means outside the drain, the drain can be kept small limiting the amount of fluid required for operation.

In the absence of an angular rate applied to vortex rate sensor 10 fluid from inlets 11, through coupler 13, flows radially inwardly toward drains 14 and 15. The flow is pure sink flow and enters drain 15 with only a radial component of velocity. The fluid leaves drain 15 with only a radial component of velocity and hits flat plate 19 with a zero angle of attack. Part of the flow will be evenly directed into slots 20 and 21 and from output conduits 17 and 18 in equal quantities indicating the absence of an angular rate applied to vortex rate sensor 10. Some of the fluid from drain 15 will not be trapped by slots 20 and 21 and will issue from the bottom of cylinder 16.

If an angular rate is imposed on vortex rate sensor 10 the flow in vortex chamber 12 is no longer pure sink flow. The angular rate of vortex rate sensor 10 is superimposed upon the pure sink flow therein resulting in a combined vortex sink flow whose stream line is a logarithmic spiral (ignoring viscosity). If the angular rate applied to vortex rate sensor 10 is in the counterclockwise direction the fluid will enter drain 15 with a counterclockwise spiral and hit plate 19 with a positive angle of attack (measured along the axis of plate 19). Slot 20 will receive more flow than slot 21 resulting in a higher pressure in output passage 17 than output passage 18 indicating a counterclockwise angular rate applied to vortex rate sensor 10. As the magnitude of the angular rate applied to rate sensor 10 increases it is obvious that a greater vortex effect will take place on the flow through drain 15 giving a stronger spiral, a greater angle of attack hitting plate 19, and hence a greater pressure differential in the respective output conduits.

It is believed that further description of the operation of our novel rate sensor is not necessary in view of our detailed descriptions.

One modification of our invention might be to place plate 19 along the axes of tube 55 parallel to slots 20 and 21 with a plug inside tube 55 to fluidly separate slots 20 and 21.

We claim as our invention:

1. A vortex rate sensor to detect angular rate applied thereto, comprising:
    (a) a circular vortex chamber,
    (b) means to direct fluid radially toward the center of said vortex chamber,
    (c) a drain passage communicating with the center of said vortex chamber,
    (d) a thin walled cylinder external to said drain passage and adapted to receive fluid from said drain passage,
    (e) a hollow tube positioned within said cylinder and positioned below said drain passage, in a direction transverse to the axis of said cylinder, said tube including two slots separated by a thin metal plate extending through said tube and wherein the outputs from said tube indicate the magnitude and direction of an angular rate applied to said rate sensor.

2. A device according to claim 1 wherein said cylinder is positioned below said drain passage.

3. A device according to claim 1 wherein said vortex chamber is formed by two parallel round plates and said means to direct fluid radially towards the center of said vortex chamber comprises a coupler ring positioned between said round plates.

4. A device according to claim 1 wherein said drain passage is of a constant cross-sectional area and has a substantially smaller cross-sectional area than said cylinder.

5. The device according to claim 1 wherein said hollow tube extends through said cylinder on opposite sides thereof.

References Cited

UNITED STATES PATENTS

| | | | |
|---|---|---|---|
| 3,171,422 | 3/1965 | Evans | 137—81.5 |
| 3,276,259 | 10/1966 | Bowles et al. | 137—81.5 XR |
| 3,302,466 | 2/1967 | Ogren | 73—516 |
| 3,340,737 | 9/1967 | Reilly. | |
| 3,342,196 | 9/1967 | Przybylko | 73—515 XR |
| 3,365,955 | 1/1968 | Scudder et al. | |

SAMUEL SCOTT, *Primary Examiner.*

U.S. Cl. X.R.

73—515; 137—81.5